US012686399B2

(12) United States Patent
Cui et al.

(10) Patent No.: US 12,686,399 B2
(45) Date of Patent: Jul. 21, 2026

(54) SYSTEM AND METHOD FOR A SCENARIO-BASED EVENT TRIGGER

(71) Applicant: TOYOTA RESEARCH INSTITUTE, INC., Los Altos, CA (US)

(72) Inventors: Xiongyi Cui, Somerville, MA (US); Stephen G. Mcgill, Cambridge, MA (US); Guy Rosman, Newton, MA (US); Simon A. I. Stent, Cambridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 1059 days.

(21) Appl. No.: 17/408,274

(22) Filed: Aug. 20, 2021

(65) Prior Publication Data

US 2023/0056475 A1     Feb. 23, 2023

(51) Int. Cl.
    *G06N 20/00*       (2019.01)
    *B60W 50/06*       (2006.01)
    *B60W 60/00*       (2020.01)
    *G06V 20/56*       (2022.01)

(52) U.S. Cl.
    CPC .......... *B60W 50/06* (2013.01); *B60W 60/001* (2020.02); *G06N 20/00* (2019.01); *G06V 20/56* (2022.01)

(58) Field of Classification Search
    CPC .... B60W 50/06; B60W 60/001; G06N 20/00; G06N 3/0464; G06N 3/045; G06V 20/56; G06V 10/82; G06V 20/44
    See application file for complete search history.

(56) References Cited

U.S. PATENT DOCUMENTS

| | | | |
|---|---|---|---|
| 9,000,903 B2 | 4/2015 | Bowers et al. | |
| 10,210,672 B2 | 2/2019 | James et al. | |
| 10,950,067 B2 | 3/2021 | Hutchins et al. | |
| 2011/0196571 A1 | 8/2011 | Foladare et al. | |
| 2012/0209634 A1 | 8/2012 | Ling et al. | |
| 2016/0098868 A1 | 4/2016 | Lambert et al. | |
| 2018/0348785 A1* | 12/2018 | Zheng | G06N 3/006 |
| 2019/0146492 A1* | 5/2019 | Phillips | G05B 13/041 |
| | | | 701/23 |
| 2019/0187686 A1 | 6/2019 | Cella et al. | |
| 2019/0205765 A1* | 7/2019 | Mondello | G06V 10/764 |
| 2019/0259292 A1* | 8/2019 | Williams | G06F 18/24323 |

(Continued)

OTHER PUBLICATIONS

A. Bhattacharjee and W. Shi, "Software Updates for Large-Scale Autonomous Vehicles Deployment: Challenges and Opportunities," in IEEE Internet Computing, vol. 29, No. 5, pp. 65-72, Sep.-Oct. 2025, doi: 10.1109/MIC.2025.3643221. (Year: 2025).*

*Primary Examiner* — Matthew J. Reda
(74) *Attorney, Agent, or Firm* — SEYFARTH SHAW LLP

(57) ABSTRACT

A method for scenario-based event triggers is described. The method includes generating, by a first machine-learning (ML) model, feature vectors encoding driving scenarios surrounding an ego vehicle. The method also includes detecting, by a second machine-learning (ML) model, a unique driving scenario outside of pre-programmed event triggers corresponding to one of the feature vectors encoding driving scenarios surrounding the ego vehicle. The method further includes triggering uploading of the unique driving scenario outside of pre-programmed event triggers to a central scenario-based event control server.

18 Claims, 7 Drawing Sheets

600

(56)                    References Cited

U.S. PATENT DOCUMENTS

| | | | |
|---|---|---|---|
| 2020/0057894 A1 | 2/2020 | Sambo et al. | |
| 2020/0064842 A1* | 2/2020 | Kentley-Klay | G05D 1/0027 |
| 2020/0076895 A1 | 3/2020 | Tsuyunashi et al. | |
| 2020/0111270 A1 | 4/2020 | Sato | |
| 2020/0118020 A1 | 4/2020 | Soda et al. | |
| 2020/0118359 A1 | 4/2020 | Sato | |
| 2022/0153311 A1* | 5/2022 | Yang | B60W 60/00253 |
| 2022/0161816 A1* | 5/2022 | Gyllenhammar | G06V 20/56 |
| 2022/0414384 A1* | 12/2022 | Zhang | G06F 18/214 |
| 2023/0166743 A1* | 6/2023 | Heck | G05B 13/027 |

* cited by examiner

300

301

302

306

304

Sensor
Module

312
Feature
Vector
Generation
Model

314
Scenario-
Based Event
Triggering
Model

310

316
Driving-
Scenario
Upload Trigger
Module

344

342
Transceiver

346

326
Onboard Unit

328
Location Module

329
Locomotion
Module

320
Processor

330
Planner Module

322
Computer-
Readable Medium

324
Communication
Module

340
Controller
Module

360

350

600

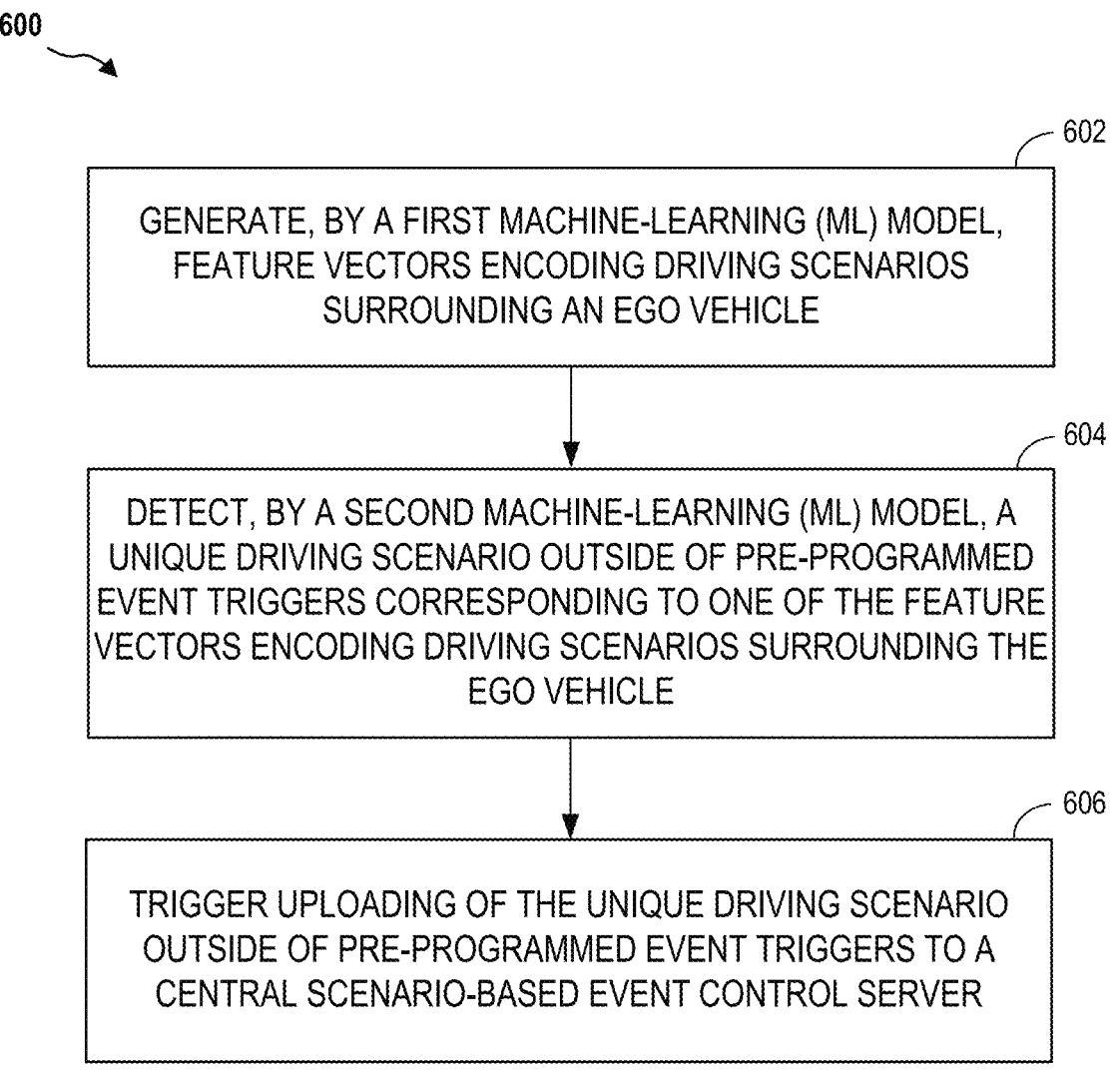

602

GENERATE, BY A FIRST MACHINE-LEARNING (ML) MODEL, FEATURE VECTORS ENCODING DRIVING SCENARIOS SURROUNDING AN EGO VEHICLE

604

DETECT, BY A SECOND MACHINE-LEARNING (ML) MODEL, A UNIQUE DRIVING SCENARIO OUTSIDE OF PRE-PROGRAMMED EVENT TRIGGERS CORRESPONDING TO ONE OF THE FEATURE VECTORS ENCODING DRIVING SCENARIOS SURROUNDING THE EGO VEHICLE

606

TRIGGER UPLOADING OF THE UNIQUE DRIVING SCENARIO OUTSIDE OF PRE-PROGRAMMED EVENT TRIGGERS TO A CENTRAL SCENARIO-BASED EVENT CONTROL SERVER

*FIG. 6*

SYSTEM AND METHOD FOR A
SCENARIO-BASED EVENT TRIGGER

BACKGROUND

Field

Certain aspects of the present disclosure generally relate to machine learning and, more particularly, to a system and method for scenario-based event triggering for uploading driving data to cloud storage over the Internet.

Background

Autonomous agents, such as self-driving cars and robots, are quickly evolving. Self-driving cars rely on various ways of perceiving an environment. Unfortunately, the various ways used by self-driving cars to perceive a surrounding environment are not entirely reliable. In addition, because self-driving cars have to interact with other vehicles, many critical concerns arise. For example, one critical concern is how to design vehicle control of an autonomous vehicle using machine learning.

Unfortunately, vehicle control by machine learning may be ineffective in situations involving complex interactions between vehicles (e.g., a situation where a controlled (ego) vehicle merges into a traffic lane). Machine learning techniques for vehicle control by selecting an appropriate vehicle control action of an ego vehicle are desired. For example, a selected speed/acceleration/steering angle of the controlled (ego) vehicle may be applied as a vehicle control action. An autonomous ego vehicle may operate according to selected vehicle control actions. These autonomous ego vehicles generate a significant amount (e.g., 100 gigabytes (GBs)) of data during operation. A system and method for improving the process of when and how information-rich events are identified and how vehicle data during these events is recorded and later uploaded to cloud storage over the Internet are desired.

SUMMARY

A method for scenario-based event triggers is described. The method includes generating, by a first machine-learning (ML) model, feature vectors encoding driving scenarios surrounding an ego vehicle. The method also includes detecting, by a second machine-learning (ML) model, a unique driving scenario outside of pre-programmed event triggers corresponding to one of the feature vectors encoding driving scenarios surrounding the ego vehicle. The method further includes triggering uploading of the unique driving scenario outside of pre-programmed event triggers to a central scenario-based event control server.

A non-transitory computer-readable medium having program code recorded thereon for scenario-based event triggers is described. The program code is executed by a processor. The non-transitory computer-readable medium includes program code to generate, by a first machine-learning (ML) model, feature vectors encoding driving scenarios surrounding an ego vehicle. The non-transitory computer-readable medium also includes program code to detect, by a second machine-learning (ML) model, a unique driving scenario outside of pre-programmed event triggers corresponding to one of the feature vectors encoding driving scenarios surrounding the ego vehicle. The non-transitory computer-readable medium further includes program code to trigger an upload of the unique driving scenario outside of pre-programmed event triggers to a central scenario-based event control server.

A system for scenario-based event triggers is described. The system includes a feature vector generator to generate feature vectors encoding driving scenarios surrounding an ego vehicle using a first machine-learning (ML) model. The system also includes a scenario-based event trigger to detect a unique driving scenario outside of pre-programmed event triggers corresponding to one of the feature vectors encoding driving scenarios surrounding the ego vehicle using a second machine-learning (ML) model. The system further includes a driving-scenario upload trigger module to trigger an upload of the unique driving scenario outside of pre-programmed event triggers to a central scenario-based event control server.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 6 is a flowchart illustrating a method for an autonomous vehicle scenario-based event triggering system, according to aspects of the present disclosure.

DETAILED DESCRIPTION

Figure 1:
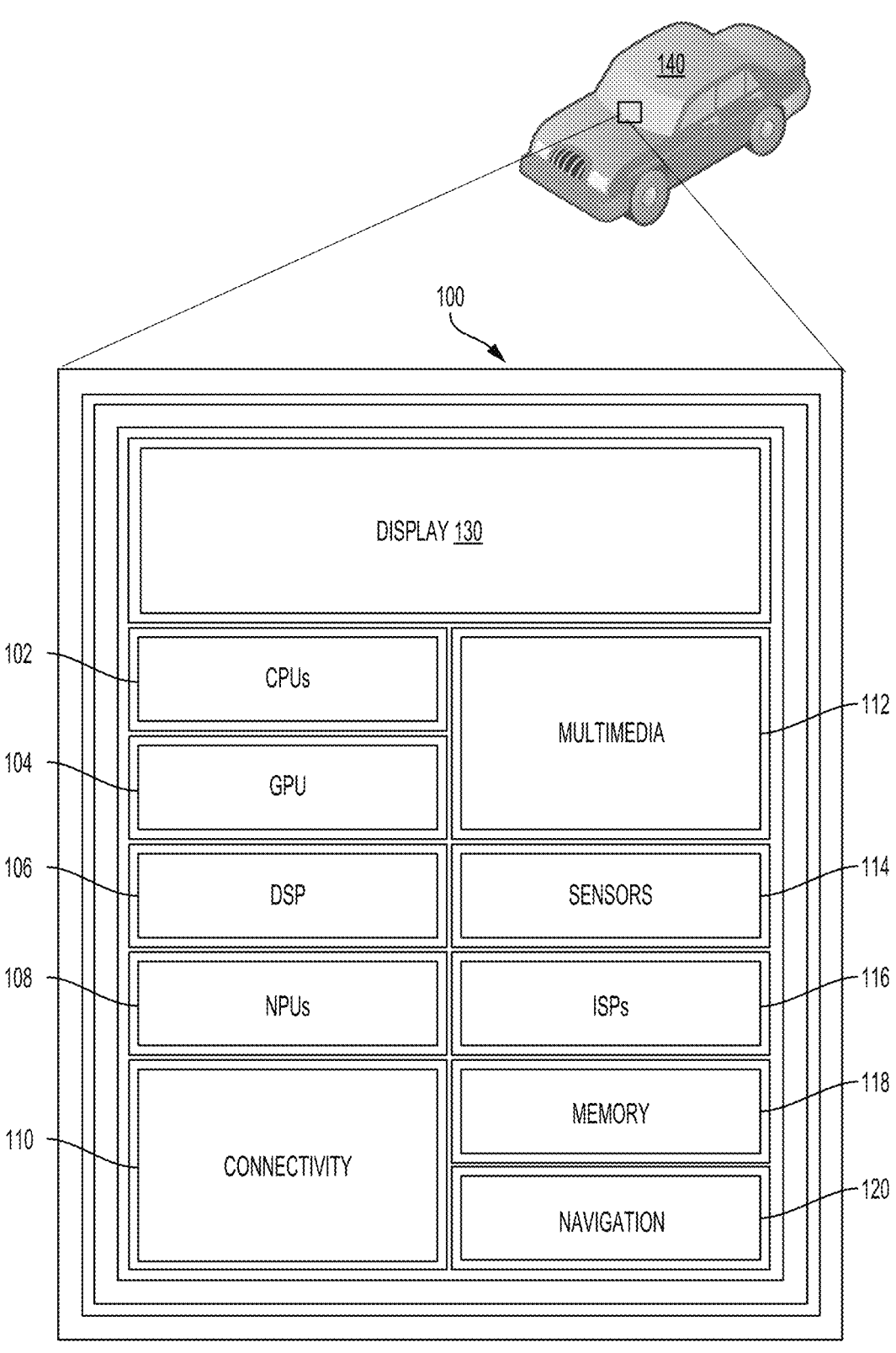
FIG. 1 illustrates an example implementation of designing a neural network using a system-on-a-chip (SOC) of an autonomous vehicle scenario-based event triggering system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, such as self-driving vehicles and robots, are quickly evolving and are a reality in this decade. Self-driving vehicles rely on various ways of perceiving an environment. Unfortunately, the various ways used by self-driving vehicles to perceive a surrounding environment are not entirely reliable. In addition, because self-driving vehicles have to interact with other vehicles, many critical concerns arise. For example, one critical concern is achieving vehicle control of an autonomous vehicle using machine learning.

Automation of vehicle control on highways is rapidly advancing. These automated vehicles are expected to reduce traffic accidents and improve traffic efficiency. In particular, machine learning techniques for vehicle control by selecting an appropriate vehicle control action of a controlled (ego) vehicle are desired. For example, a selected speed/acceleration/steering angle of the ego vehicle may be applied as a vehicle control action. Unfortunately, vehicle control by machine learning may be ineffective in situations involving complex interactions between vehicles (e.g., a situation where an ego vehicle merges into a traffic lane).

In particular, safety is a critical concern when building autonomous agents that operate in human environments. For autonomous driving in particular, safety is a formidable challenge due to high speeds, rich environments, and complex dynamic interactions with many traffic participants, including vulnerable road users. Testing and verification of machine learning techniques for vehicle control by selecting an appropriate vehicle control action of an ego vehicle are desired. For example, an autonomous test vehicle may operate according to selected vehicle control actions. Unfortunately, a test autonomous vehicle generates a significant amount of data.

For example, an autonomous vehicle configured with an event triggering system generates a significant amount (e.g., 100 gigabytes (GBs)) of data during operation. Transmitting such a large amount of data is difficult and costly. Furthermore, storing the data in a cloud-based storage for use by researchers may be impractical because of the significant amount of time it takes to download and/or process the data according to the researcher's needs. Current event identification systems usually trigger events based on manually specified rules. For example, record an event "when some sensor malfunctions," "when the driver is inattentive," "when driving at a certain speed," "when the LIDAR/camera emits an unlikely detection," etc.

These rule-based triggers work moderately well for improving known issues when clues are available to determine whether the issue occurred. For example, an event trigger is configured to detect left turns while the vehicle is running to improve the left turn behavior of an autonomous vehicle. The associated data is uploaded to the cloud during these events. These left turns provide examples, which are used to benchmark and test various left turn behavior algorithms. Nevertheless, there are exceptions to rule-based triggers. In addition, there are scenarios that are hard to capture using solely rule-based triggers. For example, scenarios in which an ego vehicle is performing a lane change and an autonomous driving object (ado) vehicle is trying to cut in, or a pedestrian appears on either side of the road, are difficult to capture using rule-based triggers. The different scenario possibilities are endless and they are hard to describe using rule-based triggers.

Aspects of the present disclosure are directed to an improved process of identifying information-rich events and associated vehicle data during these events to record and later upload to cloud storage over the Internet. These aspects of the present disclosure are directed to discovering and capturing rare, but impactful, real driving scenarios that are unseen by automated driving models. Some aspects of the present disclosure identify and provide these novel data points to improve prevention of unpredictable behavior from automated driving models. In particular, an "event trigger" system is leveraged, in which the event trigger system identifies junction scenarios, including left turns, from prototype vehicle logs. While this event trigger system is composed of many engineer-specified rules, some aspects of the present disclosure provide a novel system that augments this trigger system to find related events (e.g., similar to left turns) that the rules did not identify.

In some aspects of the present disclosure, a central scenario-based event control is provided a server that connects to each ego vehicle for providing additional instructions on what event should or should not trigger. For example, an engineer may program an event trigger for U-turns performed in rainy conditions that is not currently present in the ego vehicle. The engineer may activate the event trigger by sending a command to convey the message to record and upload each scenario matching the event trigger for a specific group of vehicles. In this example, the autonomous vehicles may be selected by their geolocation, model number, sensor package version, and the like. In some aspects, the central scenario-based event control provides the capability to delete a scenario-based event trigger from a group of vehicles.

In these aspects of the present disclosure, the central scenario-based event control may also change other parameters of the scenario-based event trigger, including the length of the event to record, the type of sensor to record, the priority of the triggers (e.g., an event trigger priority) which are used to determine which logs (e.g., an identification of logs) are deleted in the event where the non-uploaded event data exceed the vehicle data storage. This aspects of the present disclosure provides a mechanism to perform centralized scenario-based event triggers to gather data from a fleets vehicle on a massive scale. Some aspects of the present disclosure involve a machine learning model to categorize and detect driving scenarios that are error pruning, complex or interesting.

FIG. 1 illustrates an example implementation of the aforementioned system and method for an autonomous vehicle scenario-based event triggering system using a system-on-a-chip (SOC) 100 of a vehicle vision system for an autonomous vehicle 140. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, select a certified vehicle control action, according to the display 130 illustrating a view of a vehicle.

In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system. The SOC 100 may be based on an Advanced Risk Machine (ARM) instruction set or the like. In another aspect of the present disclosure, the SOC 100 may be a server computer in communication with the autonomous vehicle 140. In this arrangement, the autonomous vehicle 140 may include a processor and other features of the SOC 100.

In this aspect of the present disclosure, instructions loaded into a processor (e.g., CPU 102) or the NPU 108 of the autonomous vehicle 140 may include code to upload driving session data, based on an images captured by the sensor processor 114, from a computer of a drive site to a network attached storage of the drive site. The instructions loaded into a processor (e.g., CPU 102) may also include code to upload the driving session data from the network attached storage of the drive site to a cloud-based storage location in response to the images captured by the sensor processor 114. The instructions loaded into a processor (e.g., CPU 102) may also include code for to distribute the driving session data from the cloud-based storage location and a work unit to at least one research site separate from the drive site. The instructions loaded into a processor (e.g., CPU 102) may also include code for to process, by the at least one research site, the driving session data according to an analysis/processing task associated with the work unit.

Figure 2:
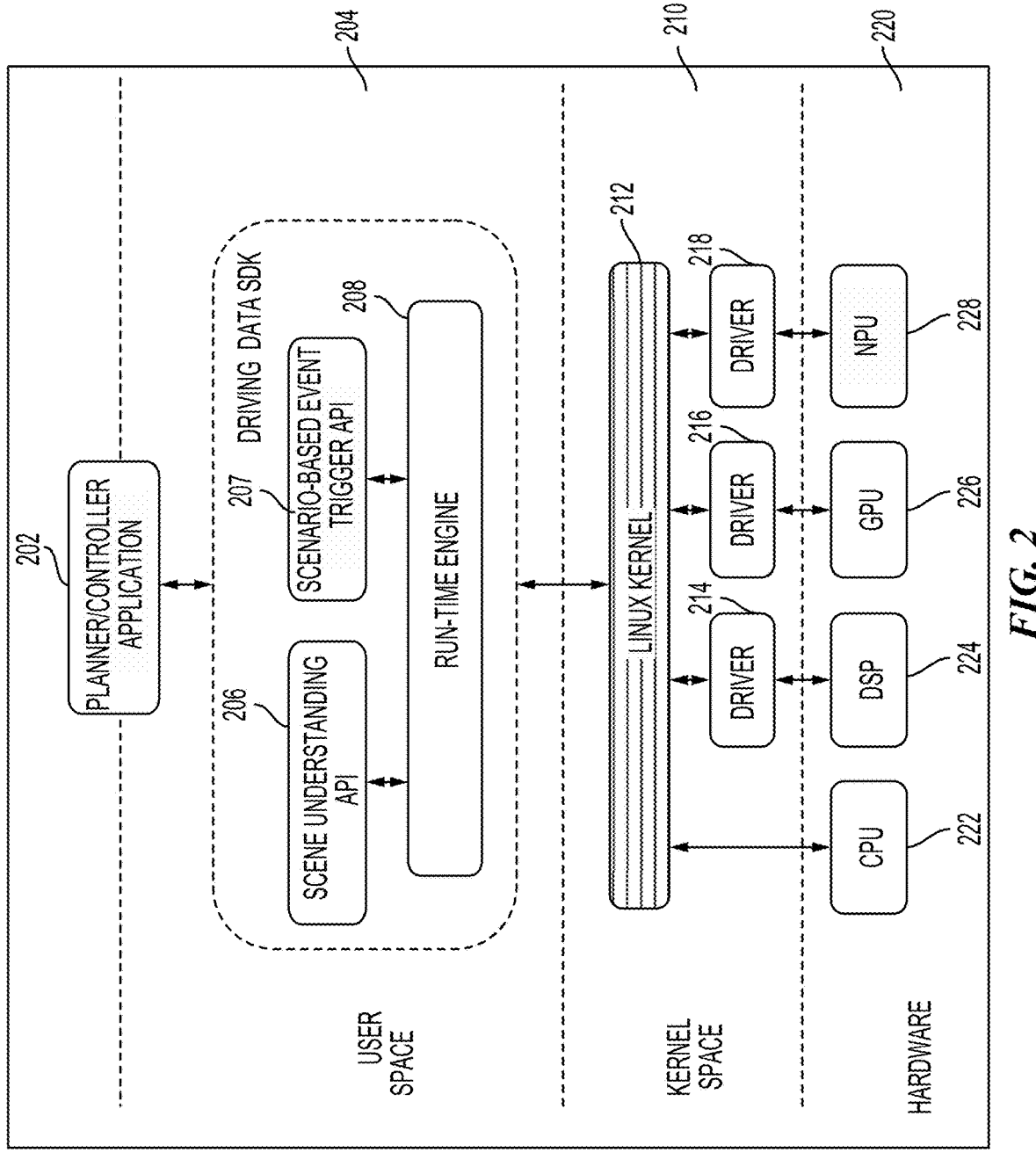
FIG. 2 is a block diagram illustrating an exemplary software architecture that may modularize artificial intelligence (AI) functions for an autonomous vehicle scenario-based event triggering system, according to aspects of the present disclosure.

FIG. 2 is a block diagram illustrating a software architecture 200 that may modularize artificial intelligence (AI) functions for an autonomous vehicle scenario-based event triggering system, according to aspects of the present disclosure. Using the architecture, a planner/controller application 202 may be designed such that it may cause various processing blocks of an SOC 220 (for example a CPU 222, a DSP 224, a GPU 226, and/or an NPU 228) to perform supporting computations during run-time operation of the planner/controller application 202. While FIG. 2 describes the software architecture 200 for an autonomous vehicle scenario-based event triggering system, it should be recognized that the scenario-based event triggering system is not limited to autonomous agents. According to aspects of the present disclosure, the scenario-based event triggering functionality is applicable to any vehicle type.

The planner/controller application 202 may be configured to call functions defined in a user space 204 that may, for example, provide for autonomous vehicle scenario-based event triggering services. The planner/controller application 202 may make a request for compiled program code associated with a library defined in a scene understanding application programming interface (API) 206. The scene understanding API 206 is configured for generating a feature vector according to an understanding of a scene. In response, compiled code of a scenario-based event trigger API 207 enables detection of unique driving scenarios outside of pre-programmed event triggers. That is, the scene understanding API 206 and the scenario-based event trigger API 207 enable discovering and capturing rare, but impactful, real driving scenarios that are unseen by automated driving models according to the scene understanding API 206.

A run-time engine 208, which may be compiled code of a run-time framework, may be further accessible to the planner/controller application 202. The planner/controller application 202 may cause the run-time engine 208, for example, to take actions for scenario-based event triggering services from an autonomous vehicle. When an ego vehicle encounters a scenario-based event trigger, the run-time engine 208 may in turn send a signal to an operating system 210, such as a Linux Kernel 212, running on the SOC 220. FIG. 2 illustrates the Linux Kernel 212 as software architecture for autonomous vehicle scenario-based event triggering. It should be recognized, however, that aspects of the present disclosure are not limited to this exemplary software architecture. For example, other kernels may provide the software architecture to support autonomous vehicle test data distribution and analysis functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, a machine learning algorithm may be configured to run on a combination of processing blocks, such as the CPU 222 and the GPU 226, or may be run on the NPU 228, if present.

The growing complexity of software in autonomous vehicles makes it more difficult to ensure reliability of these autonomous vehicles. For example, the risk of unexpected catastrophic failures remains, although aggregate safety measures are improved. In particular, safety is a critical concern when building autonomous agents that operate in human environments. For autonomous driving in particular, safety is a formidable challenge due to high speeds, rich environments, and complex dynamic interactions with many traffic participants, including vulnerable road users. In addition, autonomous vehicles generate significant amounts of data during operation. Uploading such a large amount of data is difficult and costly. Furthermore, storing the data in a cloud-based storage is impractical. A system and method for improving the process of when and how information-rich driving events are identified and how vehicle data during these events is recorded and later uploaded to cloud storage over the Internet are desired.

Figure 3:
FIG. 3 is a diagram illustrating a hardware implementation for an autonomous vehicle scenario-based event triggering system, according to aspects of the present disclosure.

FIG. 3 is a diagram illustrating a hardware implementation for a scenario-based event triggering system 300, according to aspects of the present disclosure. The scenario-based event triggering system 300 may be configured for identifying information-rich events and associated vehicle data during these events to record and later upload to cloud storage over the Internet. The scenario-based event triggering system 300 is directed to discovering and capturing rare, but impactful, real driving scenarios that are unseen by automated driving models. Some aspects of the scenario-based event triggering system 300 identify and provide these novel data points to improve prevention of unpredictable behavior from automated driving models.

The scenario-based event triggering system 300 includes a vehicle control system 301 and a central scenario-based event control server 370 in this aspect of the present disclosure. The vehicle control system 301 may be a component of a vehicle, a robotic device, or other non-autonomous device (e.g., non-autonomous vehicles, ride-share cars, etc.). For example, as shown in FIG. 3, the vehicle control system 301 is a component of an autonomous vehicle 350. Aspects of the present disclosure are not limited to the vehicle control system 301 being a component of the autonomous vehicle 350. Other devices, such as a bus, motorcycle, or other like non-autonomous vehicle, are also contemplated for implementing the vehicle control system 301. In this example, the autonomous vehicle 350 may be autonomous or semi-autonomous; however, other configurations for the autonomous vehicle 350 are contemplated.

The central scenario-based event control server 370 may connect to the autonomous vehicle 350 for providing additional instructions on what event should or should not trigger. For example, an engineer may program an event trigger for U-turns performed in rainy conditions that is not currently present in the autonomous vehicle 350. The engineer may activate the event trigger by sending a command to convey the message to record and upload each scenario matching the event trigger for the autonomous vehicle 350. In this example, the autonomous vehicle 350 may be selected by geolocation, model number, sensor package version, and the like. In some aspects, the central scenario-based event control server 370 provides the capability to delete a scenario-based event trigger from the autonomous vehicle 350. The central scenario-based event control server 370 may also change other parameters of the scenario-based event trigger, including the length of the event to record, the type of sensor to record, the priority of the triggers which are used to determine which logs are deleted in the event where the non-uploaded data exceed the vehicle data storage.

The vehicle control system 301 may be implemented with an interconnected architecture, represented generally by an interconnect 346. The interconnect 346 may include any number of point-to-point interconnects, buses, and/or bridges depending on the specific application of the vehicle control system 301 and the overall design constraints. The interconnect 346 links together various circuits including one or more processors and/or hardware modules, represented by a sensor module 302, a vehicle perception module 310, a processor 320, a computer-readable medium 322, a communication module 324, an onboard unit 326, a location module 328, a locomotion module 329, a planner module 330, and a controller module 340. The interconnect 346 may also link various other circuits such as timing sources, peripherals, voltage regulators, and power management circuits, which are well known in the art, and therefore, will not be described any further.

The vehicle control system 301 includes a transceiver 342 coupled to the sensor module 302, the vehicle perception module 310, the processor 320, the computer-readable medium 322, the communication module 324, the onboard unit 326, the location module 328, the locomotion module 329, the planner module 330, and the controller module 340. The transceiver 342 is coupled to an antenna 344. The transceiver 342 communicates with various other devices over a transmission medium. For example, the transceiver 342 may receive commands via transmissions from a user or a connected vehicle. In this example, the transceiver 342 may receive/transmit information for the vehicle perception module 310 to/from connected vehicles within the vicinity of the autonomous vehicle 350.

The vehicle control system 301 includes the processor 320 coupled to the computer-readable medium 322. The processor 320 performs processing, including the execution of software stored on the computer-readable medium 322 to provide scenario-based event triggering functionality according to the present disclosure. The software, when executed by the processor 320, causes the vehicle control system 301 to perform the various functions described for autonomous vehicle test data distribution and analysis for the autonomous vehicle 350, or any of the modules (e.g., 302, 310, 324, 328, 329, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle perception module 310, the communication module 324, the onboard unit 326, the location module 328, the locomotion module 329, the planner module 330, and/or the controller module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 342. The first sensor 306 and the second sensor 304 may be coupled to the autonomous vehicle 350 or may be in communication with the autonomous vehicle 350.

The location module 328 may determine a location of the autonomous vehicle 350. For example, the location module 328 may use a global positioning system (GPS) to determine the location of the autonomous vehicle 350. The location module 328 may implement a dedicated short-range communication (DSRC)-compliant GPS unit. A DSRC-compliant GPS unit includes hardware and software to make the autonomous vehicle 350 and/or the location module 328 compliant with the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 342. For example, the communication module 324 may be configured to provide communication capabilities via different wireless protocols, such as 5G new radio (NR), Wi-Fi, long term evolution (LTE), 4G, 3G, etc. The communication module 324 may also communicate with other components of the autonomous vehicle 350 that are not modules of the vehicle control system 301. The transceiver 342 may be a communications channel through a network access point 360. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

The vehicle control system 301 also includes a planner module 330 for planning a route and a controller module 340 for controlling the locomotion of the autonomous vehicle 350, via the locomotion module 329 for autonomous operation of the autonomous vehicle 350. In one configuration, the controller module 340 may override a user input when the user input is expected (e.g., predicted) to cause a collision according to an autonomous level of the autonomous vehicle 350. The modules may be software modules running in the processor 320, resident/stored in the computer-readable medium 322, and/or hardware modules coupled to the processor 320, or some combination thereof The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn his/her attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the autonomous vehicle 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle perception module 310 may be in communication with the sensor module 302, the processor 320, the computer-readable medium 322, the communication module 324, the onboard unit 326, the location module 328, the locomotion module 329, the planner module 330, the controller module 340, and the transceiver 342. In one configuration, the vehicle perception module 310 receives sensor data from the sensor module 302. The sensor module 302 may receive the sensor data from the first sensor 306 and the second sensor 304. According to aspects of the present disclosure, the sensor module 302 may filter the data to remove noise, encode the data, decode the data, merge the data, extract frames, or perform other functions. In an alternate configuration, the vehicle perception module 310 may receive sensor data directly from the first sensor 306 and the second sensor 304.

As shown in FIG. 3, the vehicle perception module 310 includes a feature vector generation model 312, a scenario-based event triggering model 314, and a driving-scenario upload trigger module 316. The scenario-based event triggering model 314 and the feature vector generation model 312 may be components of a same or different artificial neural network, such as a deep convolutional neural network (CNN). The vehicle perception module 310 is not limited to a CNN. The vehicle perception module 310 receives a data stream from the first sensor 306 and/or the second sensor 304. The data stream may include a 2D RGB image from the first sensor 306 and LIDAR data points from the second sensor 304. The data stream may include multiple frames, such as image frames of a scene.

This configuration of the vehicle perception module 310 includes the feature vector generation model 312 for generating feature vectors encoding driving scenarios surrounding the autonomous vehicle 350. The vehicle perception module 310 also includes the scenario-based event triggering model 314 for the detecting a unique driving scenario outside of pre-programmed event triggers encountered by the autonomous vehicle 350 during operation. The unique driving scenario is represented by the feature vector generation model 312, which generates a feature vector according to an understanding of a scene including the unique driving scenario. In this aspect of the present disclosure, the unique driving scenario outside of pre-programmed event triggers is recorded by storing the corresponding feature vector. The driving-scenario upload trigger module 316 is configured for triggering uploading of the corresponding feature vector representing the unique driving scenario of an ego vehicle, for example, as shown in FIG. 4.

Figure 4:
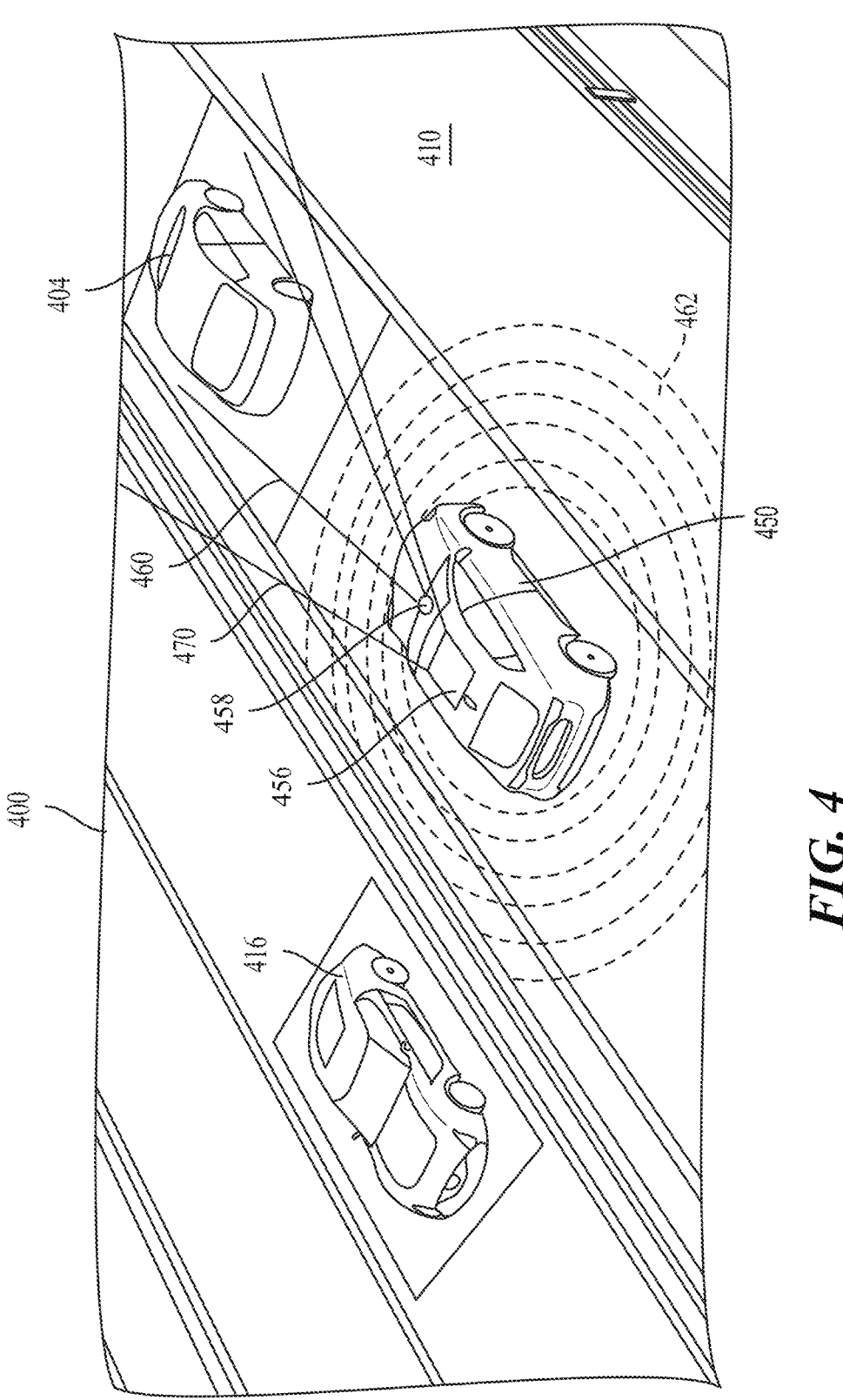
FIG. 4 is a drawing illustrating an example of an ego vehicle in an environment, according to aspects of the present disclosure.

FIG. 4 illustrates an example of an ego vehicle 450 (e.g., the autonomous vehicle 350) in an environment 400, according to aspects of the present disclosure. As shown in FIG. 4, the ego vehicle 450 is traveling on a road 410. A first vehicle 404 (e.g., other agent) may be ahead of the ego vehicle 450, and a second vehicle 416 may be adjacent to the ego vehicle 450. In this example, the ego vehicle 450 may include a 2D camera 456, such as a 2D red-green-blue (RGB) camera, and a second sensor 458. The second sensor 458 may be another RGB camera or another type of sensor, such as ultrasound, radio detection and ranging (RADAR), and/or light detection and ranging (LIDAR), as shown by reference number 462. Additionally, or alternatively, the ego vehicle 450 may include one or more additional sensors. For example, the additional sensors may be side facing and/or rear facing sensors.

In one configuration, the 2D camera 456 captures a 2D image that includes objects in the field of view 460 of the 2D camera 456. The second sensor 458 may generate one or more output streams. The 2D image captured by the 2D camera 456 includes a 2D image of the first vehicle 404, as the first vehicle 404 is in the field of view 460 of the 2D camera 456. A field of view 470 of the second sensor 458 is also shown.

The information obtained from the 2D camera 456 and the second sensor 458 may be used to navigate the ego vehicle 450 along a route when the ego vehicle 450 is in an autonomous mode. The 2D camera 456 and the second sensor 458 may be powered from electricity provided from the battery (not shown) of the ego vehicle 450. The battery may also power the motor of the ego vehicle 450. The information obtained from the 2D camera 456 and the second sensor 458 may be used to generate a 3D representation of an environment.

The growing complexity of software in the ego vehicle 450 makes it more difficult to ensure reliability of the ego vehicle 450. For example, the risk of unexpected catastrophic failures remains, although aggregate safety measures are improved. In particular, safety is a critical concern when designing the ego vehicle 450 to operate in human environments. For autonomous driving of the ego vehicle 450, in particular, safety is a formidable challenge due to high speeds, rich environments, and complex dynamic interactions with many traffic participants, including vulnerable road users. In addition, the ego vehicle 450 generates significant amounts of data during operation. Uploading such a large amount of data is difficult and costly. Furthermore, storing the data in a cloud-based storage is impractical. A system and method for improving the process of when and how information-rich driving events are identified and how vehicle data during these events is recorded and later uploaded to cloud storage over the Internet are desired.

In one aspect of the present disclosure, the central scenario-based event control server 370 (FIG. 3) may connect to the first vehicle 404, ahead of the ego vehicle 450, and the second vehicle 416, adjacent to the ego vehicle 450. The central scenario-based event control server 370 connects to this group of vehicles for providing additional instructions on what event should or shouldn't trigger. For example, when engineers decide they want to trigger events for U-turns performed in rainy conditions, and this trigger is not currently present in the vehicles, the central scenario-based event control server 370 sends out a command to record and upload every similar event by the group of vehicles, as shown in FIG. 4.

For example, the group of vehicles (e.g., the first vehicle 404, the second vehicle 416, and the ego vehicle 450) may be selected by their geolocation, model number, sensor package version, and the like. The central scenario-based event control server 370 includes the capability to delete a trigger from the group of vehicles. In addition, the central scenario-based event control server 370 may change other parameters of the event triggers, including the length of the recorded event, the type of sensor to record, and the priority of the event triggers. These parameters may determine which driving logs (e.g., telemetry logs) of the group of vehicles are deleted in the event where the data exceeds the vehicle data storage, etc.

These aspects of the present disclosure are directed to identifying information-rich events and associated vehicle data during these events to record and later upload to cloud storage (e.g., the central scenario-based event control server 370) over the Internet. Some aspects of the present disclosure discover and capture rare, but impactful, real driving scenarios that are unseen by automated driving models. Some aspects of the present disclosure identify and provide these novel data points to improve prevention of unpredictable behavior from automated driving models. In particular, an event trigger system is leveraged, in which the event trigger system identifies junction scenarios, including left turns, from prototype vehicle logs. While this event trigger system is composed of many engineer-specified rules, some aspects of the present disclosure provide a novel system that augments this trigger system to find related events (e.g., similar to left turns) that the rules failed to identify.

Figure 5A:
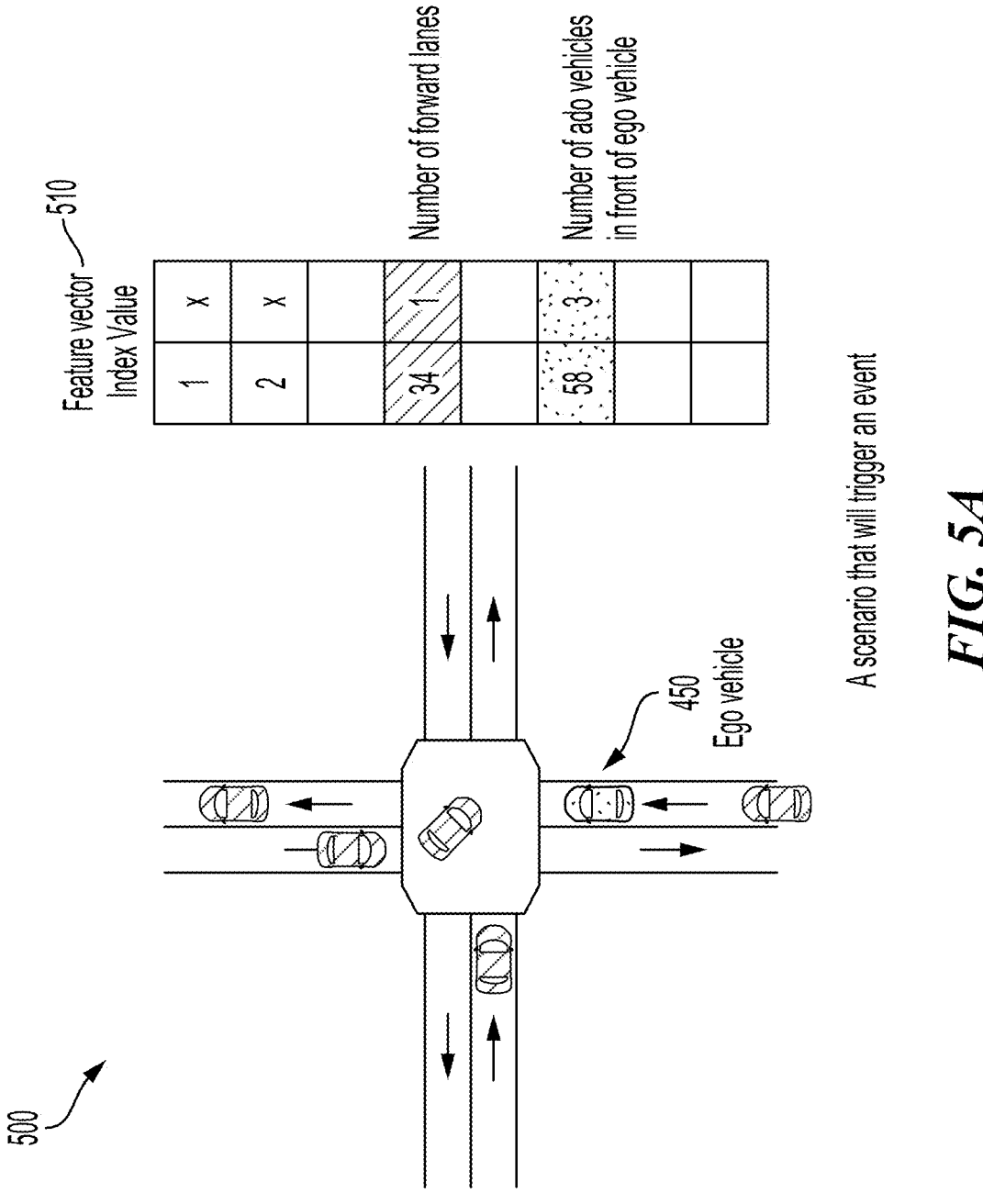
FIGS. 5A and 5B illustrate a first type of event trigger based on a feature vector generated according to an understanding of a surrounding scene captured by an ego vehicle, according to aspects of the present disclosure.
Figure 5B:
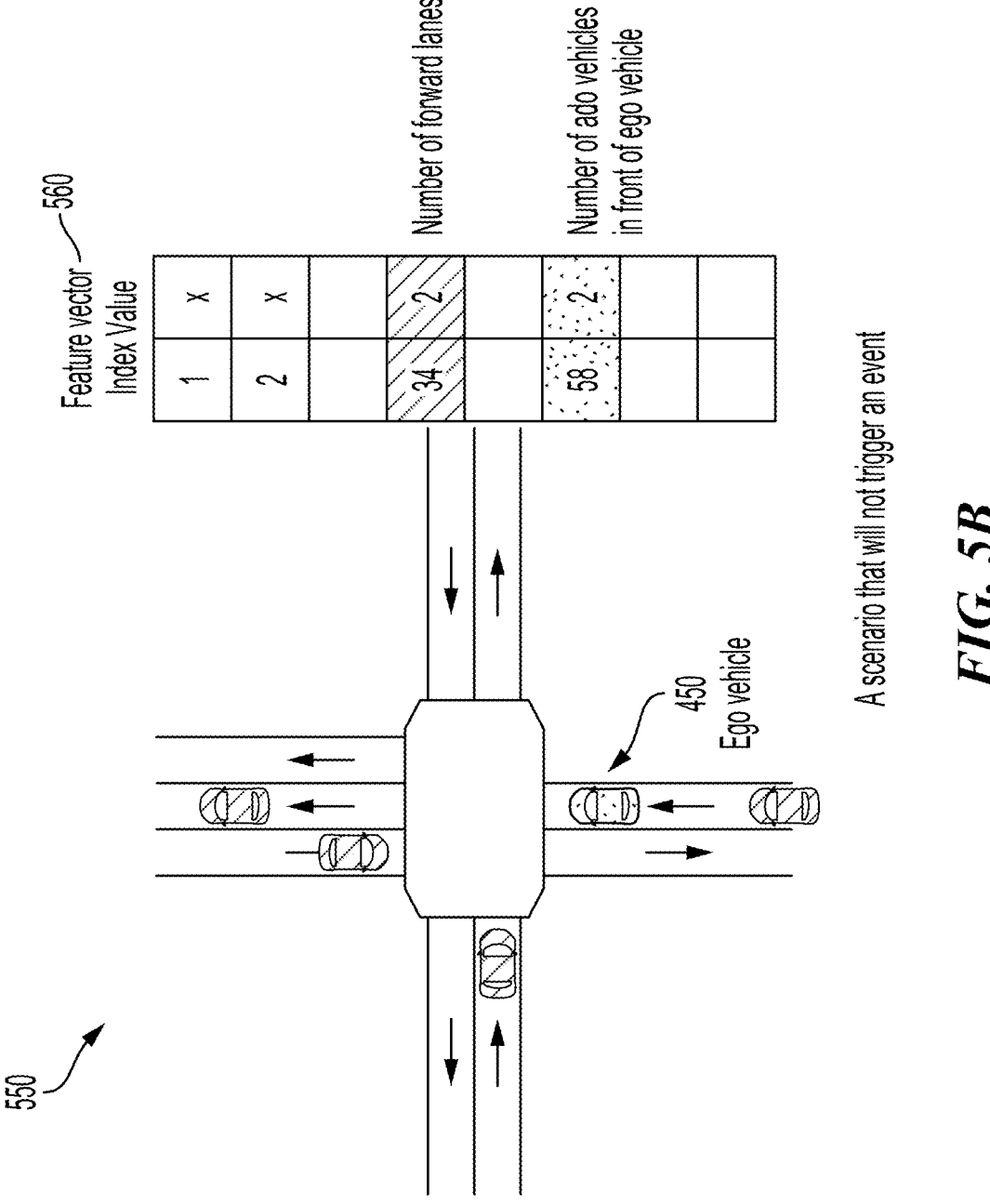

FIGS. 5A and 5B illustrate a first type of event trigger based on a feature vector generated according to an understanding of a surrounding scene captured by an ego vehicle, according to aspects of the present disclosure. Some aspects of the present disclosure leverage two types of smart event triggers. For example, a first type of smart trigger employs a machine learning (ML) model that operates in a manner similar to a hash function. In this example, an input to the ML model consists of a perception output (e.g., an object detection result, a scene segmentation result, a lane line detection, etc.), a local map, a navigation/vehicle control result, weather information, as well as a vehicle status. For example, the vehicle status may include information regarding an antilock braking system (ABS) of the ego vehicle 450, a number of passengers in the ego vehicle 450, and other available information. The other available information may include information, such as information in a controller area network (CAN) bus of the ego vehicle 450.

As shown in FIG. 5A, a first output of the ML model (e.g., the feature vector generation model 312) is a first feature vector 510 consisting of float numbers, which represent a first driving scenario 500 surrounding the ego vehicle 450. In some aspects of the present disclosure, the central scenario-based event control server 370 sends commands on what type of driving scenarios to trigger, as defined by a range of float numbers. In this example, the first feature vector 510 consists of one-hundred (100) float numbers. For example, the 34th number in the first feature vector 510 represents the number of forward lanes, and the 58th number represents the number of autonomous driving object (ado) vehicles in front of the ego vehicle within 20 meters.

As shown in FIG. 5B, a second output of the ML model (e.g., the feature vector generation model 312) is a second feature vector 560 consisting of float numbers, which represent a second driving scenario 550 surrounding the ego vehicle 450. In this example, the second feature vector 560 also consists of one-hundred (100) float numbers in a similar configuration to the first feature vector 510 of FIG. 5A. In this aspect of the present disclosure, the central scenario-based event control server 370 sends a command to all vehicles currently located in New York state to trigger an event when the 34th number is one (1) and 58th is greater than two (2).

As shown in the first driving scenario 500 of FIG. 5A, the ego vehicle 450 is located in New York state and triggers an event as there is one lane forward and there are three or more ado vehicles in front of the ego vehicle 450. This first driving scenario 500 is recorded by the ego vehicle 450, and all requested data is uploaded whenever possible. As shown in the second driving scenario 550 of FIG. 5B, the ego vehicle 450 is also located in New York state but does not trigger an event as there are two forward lanes and there are two ado vehicles in front of the ego vehicle 450. This second driving scenario 550 is not recorded or uploaded by the ego vehicle 450.

The vector representation of the first feature vector 510 and second feature vector 560 may provide a uniqueness measure for the whole dataset of a first ML model (e.g., the feature vector generation model 312) according to different driving scenarios. The ego vehicle 450 could upload scenarios that are near or not present in the machine learning dataset. In some aspects of the present disclosure, a second ML model receives the same inputs as the first ML model and output a binary decision of whether to trigger an event. This aspect of the present disclosure provides advantages, such as a simplified training setup. Unfortunately, a downside of the second ML is that the triggered scenario is less predictable and interpretable. In addition, updating what scenario to trigger, involves a new model that is trained and deployed on the ego vehicle 450.

In aspects of the present disclosure, a second type of smart trigger involves a second ML model to detect uncertain event trigger detections. The input to this second ML model may be the output of other machine learning models (e.g., the second ML model) and some of the intermediate output of other machine learning models. The output includes the possibility that there are detection results for which the other models (e.g., target model) lack confidence. For example, on a rainy day, a camera image captured by the ego vehicle is blurred by the rain, which causes a detection to mistake a traffic cone for a pedestrian. In this example, a perception module lacks confidence in the detection of the traffic cone as a pedestrian. In these aspects of the present disclosure, this output and some intermediate output from the perception model of the ego vehicle 450 is fed to the proposed model. In some aspects of the present disclosure, the proposed model detects that the perception model lacks confidence regarding the detected result and triggers an event in response to a lack of confidence indicated by the perception model.

FIG. 6 is a flowchart illustrating a method for scenario-based event triggers, according to aspects of the present disclosure. A method 600 of FIG. 6 begins at block 602, in which a first machine-learning (ML) model generates feature vectors encoding driving scenarios surrounding an ego vehicle. For example, as described in FIG. 3, the vehicle perception module 310 includes the feature vector generation model 312 (e.g., a feature vector generator) for generating feature vectors encoding driving scenarios surrounding the autonomous vehicle 350. As shown in FIGS. 5A and 5B, the vector representation of the first feature vector 510 and the second feature vector 560 may provide a uniqueness measure for the whole dataset of a first ML model (e.g., the feature vector generation model 312) according to different driving scenarios. The first feature vector 510 and second feature vector 560 may be generated by running sensor data captured by the autonomous vehicle 350 through the feature vector generation model 312.

Referring again to FIG. 6, at block 604, a second machine-learning (ML) model detects a unique driving scenario outside of pre-programmed event triggers corresponding to one of the feature vectors encoding driving scenarios surrounding the ego vehicle. For example, as shown in FIG. 3, the vehicle perception module 310 also includes the scenario-based event triggering model 314 for the detecting a unique driving scenario outside of pre-programmed event triggers encountered by the autonomous vehicle 350 during operation. For example, the scenario-based event triggering model 314 may analyze an output vector from the feature vector generation model 312 to determine whether to trigger an event. For example, as shown in the first driving scenario 500 of FIG. 5A, the ego vehicle 450 is located in New York state and triggers an event as there is one lane forward and there are three or more ado vehicles in front of the ego vehicle 450 based on the first feature vector 510.

At block 606, uploading of the unique driving scenario outside of pre-programmed event triggers is trigger to a central scenario-based event control server. For example, as shown in FIG. 3, the unique driving scenario outside of pre-programmed event triggers is recorded by storing the corresponding feature vector. The driving-scenario upload trigger module 316 is configured for triggering uploading of the corresponding feature vector representing the unique driving scenario of an ego vehicle, for example, as shown in FIG. 4. As shown in FIG. 5A, the first driving scenario 500 is recorded by the ego vehicle 450, and all requested data is uploaded whenever possible. As shown in the second driving scenario 550 of FIG. 5B, the ego vehicle 450 is also located in New York state but does not trigger an event as there are two forward lanes and there are two ado vehicles in front of the ego vehicle 450. This second driving scenario 550 is not recorded or uploaded by the ego vehicle 450.

The method 600 also includes feeding sensor data captured by the ego vehicle to the first ML model to generate vectors of hash values encoding driving scenarios surrounding the ego vehicle. The method 600 further includes determining whether a current driving scenario surrounding the ego vehicle corresponds to a rule-based event trigger. In the method 600, the ego vehicle forms part of a fleet of vehicles.

Aspects of the present disclosure are directed to an improved process of identifying information-rich events and associated vehicle data during these events to record and later upload to cloud storage over the Internet. These aspects of the present disclosure are directed to discovering and capturing rare, but impactful, real driving scenarios that are unseen by automated driving models. Some aspects of the present disclosure identify and provide these novel data points to improve prevention of unpredictable behavior from automated driving models. In particular, an "event trigger" system is leveraged, in which the event trigger system identifies junction scenarios, including left turns, from prototype vehicle logs. While this event trigger system is composed of many engineer-specified rules, some aspects of the present disclosure provide a novel system that augments this trigger system to find related events (e.g., similar to left turns) that the rules did not identify.

The various operations of methods described above may be performed by any suitable means capable of performing the corresponding functions. The means may include various hardware and/or software component(s) and/or module (s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an ASIC, a field-programmable gate array signal (FPGA) or other programmable logic device (PLD), discrete gate or transistor logic, discrete hardware components, or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an ASIC with the processor, the bus interface, the user interface, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. computer-readable media include both computer storage media and communication media, including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for scenario-based event triggers, comprising:

generating, by a first machine-learning (ML) model, feature vectors encoding driving scenarios surrounding an ego vehicle;

detecting, by a second machine-learning (ML) model, a unique driving scenario outside of pre-programmed event triggers corresponding to one of the feature vectors encoding driving scenarios surrounding the ego vehicle;

uploading, by the ego vehicle, recorded scenario data corresponding to the unique driving scenario outside of the pre-programmed event triggers to a central scenario-based event control server;

triggering, by the ego vehicle, a fleet of vehicles to record and upload scenario data corresponding to each fleet detected similar event related to the unique driving scenario outside of the pre-programmed event triggers to the central scenario-based event control server;

providing, by the central scenario-based event control server, additional instructions on what event should or should not trigger the fleet upload including the priority of the triggers which are used to determine which logs are deleted in the event where the non-uploaded data exceed the vehicle data storage;

training a new model according to the upload of the recorded scenario data corresponding to the unique driving scenario and each fleet detected similar event related to the unique driving scenario outside of the pre-programmed event triggers; and operating the ego vehicle with the new model to safely maneuver through the unique driving scenario outside of the pre-programmed event triggers.

2. The method of claim 1, in which generating the feature vectors encoding driving scenarios comprises:

feeding sensor data captured by the ego vehicle to the first ML model to generate vectors of hash values encoding driving scenarios surrounding the ego vehicle; and determining whether a current driving scenario surrounding the ego vehicle corresponds to a rule-based event trigger.

3. The method of claim 1, further comprising recording of the unique driving scenario outside of pre-programmed event triggers.

4. The method of claim 1, in which the detecting a unique driving scenario comprises:

receiving an output of a perception model of the ego vehicle;

identifying a detection result of the perception model for which the perception model indicates a lack of confidence; and triggering an event in response to the identifying the detection result of the perception model for which the perception model indicates the lack of confidence.

5. The method of claim 1, further comprising receiving, from the central scenario-based event control server, additional instructions regarding trigger events according to a geolocation, model number, and/or a sensor package version of the ego vehicle.

6. The method of claim 5, in which the additional instructions comprises a length of an event recorded, a type of sensor to record, an event trigger priority, and/or an identification of logs deleted when an event data exceeds a vehicle data storage.

7. The method of claim 1, further comprising categorizing and detecting driving scenarios identified as error pruning, complex and/or unique.

8. A non-transitory computer-readable medium having program code recorded thereon for scenario-based event triggers, the program code being executed by a processor and comprising:

program code to generate, by a first machine-learning (ML) model, feature vectors encoding driving scenarios surrounding an ego vehicle;

program code to detect, by a second machine-learning (ML) model, a unique driving scenario outside of pre-programmed event triggers corresponding to one of the feature vectors encoding driving scenarios surrounding the ego vehicle;

program code to upload, by the ego vehicle, recorded scenario data corresponding to the unique driving scenario outside of the pre-programmed event triggers to a central scenario-based event control server;

program code to trigger, by the ego vehicle, a fleet of vehicles to record and upload scenario data corresponding to each fleet detected similar event related to the unique driving scenario outside of pre-programmed event triggers to the central scenario-based event control server;

program code to provide, by the central scenario-based event control server, additional instructions on what event should or should not trigger the fleet upload including the priority of the triggers which are used to determine which logs are deleted in the event where the non-uploaded data exceed the vehicle data storage;

program code to train a new model according to the upload of the recorded scenario data corresponding to the unique driving scenario and each fleet detected similar event related to the unique driving scenario outside of the pre-programmed event triggers; and program code to operate the ego vehicle using the new model to safely maneuver through the unique driving scenario outside of the pre-programmed event triggers.

9. The non-transitory computer-readable medium of claim 8, in which the program code to generate the feature vectors encoding driving scenarios comprises:

program code to feed sensor data captured by the ego vehicle to the first ML model to generate vectors of hash values encoding driving scenarios surrounding the ego vehicle; and program code to determine whether a current driving scenario surrounding the ego vehicle corresponds to a rule-based event trigger.

10. The non-transitory computer-readable medium of claim 8, further comprising program code to record the unique driving scenario outside of pre-programmed event triggers.

11. The non-transitory computer-readable medium of claim 8, in which the program code to detect a unique driving scenario comprises:

program code to receive an output of a perception model of the ego vehicle;

program code to identify a detection result of the perception model for which the perception model indicates a lack of confidence; and program code to trigger the event in response to the identifying the detection result of the perception model for which the perception model indicates the lack of confidence.

12. The non-transitory computer-readable medium of claim 8, further comprising program code to receive, from the central scenario-based event control server, additional instructions regarding trigger events according to a geolocation, model number, and/or a sensor package version of the ego vehicle.

13. The non-transitory computer-readable medium of claim 12, in which the additional instructions comprises a length of the event recorded, a type of sensor to record, an event trigger priority, and/or an identification of logs deleted when an event data exceeds a vehicle data storage.

14. The non-transitory computer-readable medium of claim 8, further comprising program code to categorize and detect driving scenarios identified as error pruning, complex and/or unique.

15. A system for scenario-based event triggers, comprising:

a feature vector generator to generate feature vectors encoding driving scenarios surrounding an ego vehicle using a first machine-learning (ML) model;

a scenario-based event trigger to detect a unique driving scenario outside of pre-programmed event triggers corresponding to one of the feature vectors encoding driving scenarios surrounding the ego vehicle using a second machine-learning (ML) model and to upload, by the ego vehicle, recorded scenario data corresponding to the unique driving scenario outside of the pre-programmed event triggers to a central scenario-based event control server; and a driving-scenario upload trigger module to trigger, by the ego vehicle, a fleet of vehicles to record and upload scenario data corresponding to each fleet detected similar event related to the unique driving scenario outside of pre-programmed event triggers to the central scenario-based event control server, to provide, by the central scenario-based event control server, additional instructions on what event should or should not trigger the fleet upload including the priority of the triggers which are used to determine which logs are deleted in the event where the non-uploaded data exceed the vehicle data storage, and to train a new model according to the upload of the recorded scenario data corresponding to the unique driving scenario and each fleet detected similar event related to the unique driving scenario outside of the pre-programmed event triggers and to operate the ego vehicle using the new model to safely maneuver through the unique driving scenario outside of the pre-programmed event triggers.

16. The system of claim 15, in which the feature vector generator is further to feed sensor data captured by the ego vehicle to the first ML model to generate vectors of hash values encoding driving scenarios surrounding the ego vehicle, and to determine whether a current driving scenario surrounding the ego vehicle corresponds to a rule-based event trigger.

17. The system of claim 15, further comprising the central scenario-based event control server to provide additional instructions regarding trigger events according to a geolocation, model number, and/or a sensor package version of the ego vehicle.

18. The system of claim 15, in which the driving-scenario upload trigger module is further configured to categorize and detect driving scenarios identified as error pruning, complex and/or unique.

* * * * *